United States Patent
Sunagawa

(10) Patent No.: US 11,381,691 B2
(45) Date of Patent: Jul. 5, 2022

(54) ELECTRONIC APPARATUS, METHOD FOR CONTROLLING ELECTRONIC APPARATUS, AND NON-TRANSITORY RECORDING MEDIUM

(71) Applicant: Yuki Sunagawa, Kanagawa (JP)

(72) Inventor: Yuki Sunagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/447,214

(22) Filed: Sep. 9, 2021

(65) Prior Publication Data

US 2022/0109761 A1 Apr. 7, 2022

(30) Foreign Application Priority Data

Oct. 5, 2020 (JP) .............................. JP2020-168471

(51) Int. Cl.
*H04N 1/00* (2006.01)

(52) U.S. Cl.
CPC ....... *H04N 1/00082* (2013.01); *H04N 1/0009* (2013.01); *H04N 1/00037* (2013.01); *H04N 1/00074* (2013.01); *H04N 1/00891* (2013.01); *H04N 1/00904* (2013.01); *H04N 2201/0094* (2013.01)

(58) Field of Classification Search
CPC ............. H04N 1/0009; H04N 1/00029; H04N 1/00037; H04N 1/00039; H04N 1/00074; H04N 1/00082; H04N 1/00084; H04N 1/00891; H04N 1/00904; H04N 2201/0094

USPC ......................................................... 358/1.14
See application file for complete search history.

(56) References Cited

U.S. PATENT DOCUMENTS

| | | | |
|---|---|---|---|
| 10,585,755 B2* | 3/2020 | Yamamoto | G06F 11/0793 |
| 2014/0143562 A1 | 5/2014 | Sunagawa | |
| 2015/0062614 A1* | 3/2015 | Takatani | G03G 15/55 358/1.14 |
| 2017/0264767 A1* | 9/2017 | Sunagawa | H04N 1/0083 |

FOREIGN PATENT DOCUMENTS

JP 2017-162177 9/2017

* cited by examiner

*Primary Examiner* — Kent Yip
(74) *Attorney, Agent, or Firm* — IPUSA, PLLC

(57) ABSTRACT

An electronic apparatus includes processing devices including first circuitry, a controller including second circuitry, and a memory storing a time-out time and an extension time. The first circuitry that detects an abnormality, transmits an abnormality occurrence notification, transmits a preparation completion notification, and transmits an extension request. The second circuitry transmits a restart preparation instruction to the processing devices excluding a source of the abnormality occurrence notification, waits for the preparation completion notification until an elapse of the time-out time. The second circuitry restarts the processing devices in response to the preparation completion notification from the processing devices or the elapse of the time-out time. The second circuitry extends the time-out time by the extension time in response to the extension request and restarts the processing devices in response to the preparation completion notification or the elapse of the extension time.

11 Claims, 12 Drawing Sheets

FIG. 4

| | CONTROLLER 10 | OPERATION UNIT 20 | ENGINE 30 | FACSIMILE 40 |
|---|---|---|---|---|
| TIME-OUT TIME | 30s | 20s | 60s | 30s |
| EXTENSION TIME 1EX | 40s | 10s | 60s | 30s |
| EXTENSION TIME 2EX | 60s | 20s | 120s | 60s |

NONVOLATILE MEMORY 60

ELECTRONIC APPARATUS, METHOD FOR CONTROLLING ELECTRONIC APPARATUS, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2020-168471, filed on Oct. 5, 2020, in the Japan Patent Office, the entire disclosure of which is incorporated by reference herein.

BACKGROUND

Technical Field

Embodiments of the present disclosure relate to an electronic apparatus, a method for controlling an electronic apparatus, and a non-transitory recording medium storing program codes for controlling an electronic apparatus.

Related Art

A multifunction peripheral (MFP) as an example of electronic apparatuses includes a plurality of processing devices that execute functions such as scanning, printing, and facsimile transmission and reception, and a power control unit that controls power sources of the plurality of processing devices.

For such an electronic apparatus, when an abnormality occurs in any of the processing devices, a controller including the power control unit transmits an abnormality occurrence notification to the rest of the processing devices and causes the rest of the processing devices to prepare for restart. Then, based on a restart preparation completion notification from all of the processing devices, the controller causes the power control unit to turn off and thereafter turn on the power sources of all of the processing devices, thereby restoring the electronic apparatus to a normal state.

SUMMARY

Embodiments of the present disclosure describe an electronic apparatus, a method for controlling an electronic apparatus, and a non-transitory recording medium storing program codes for controlling the electronic apparatus. An electronic apparatus includes a plurality of processing devices, a controller configured to control power supply to each of the plurality of processing devices, and a memory that stores a time-out time for each of the plurality of processing devices and an extension time for processing executed by the plurality of processing devices. Each of the plurality of processing devices includes a first circuitry configured to detect an occurrence of an abnormality, transmit an abnormality occurrence notification to the controller in response to detecting the occurrence of the abnormality, transmit a preparation completion notification to the controller in response to completion of preparation for restart, and transmit an extension request of the time-out time to the controller in response to determining that the preparation completion notification is not to be transmitted to the controller within the time-out time. The controller includes a second circuitry configured to, based on reception of the abnormality occurrence notification, transmit a restart preparation instruction to a rest of the plurality of processing devices other than a transmission source of the abnormality occurrence notification, wait for the preparation completion notification in response to transmission of the restart preparation instruction, from each of the plurality of processing devices until an elapse of the time-out time. The second circuitry powers off and restarts each of the plurality of processing devices in response to one of a) reception of the preparation completion notification from all of the plurality of processing devices before the time-out time elapses and b) the elapse of the time-out time. The second circuitry extends the time-out time by the extension time in response to reception of the extension request, and powers off and restarts each of the plurality of processing devices in response to one of c) reception of the preparation completion notification from all of the processing devices before an elapse of the extension time and d) the elapse of the extension time.

An embodiment describes a method for controlling an electronic apparatus including a plurality of processing devices. The method includes, based on reception of an abnormality occurrence notification from at least one of the plurality of processing devices detecting an occurrence of an abnormality, transmitting a restart preparation instruction to a rest of the plurality of processing devices other than a transmission source of the abnormality occurrence notification, and waiting for a preparation completion notification in response to transmission of the restart preparation instruction, or an extension request of a time-out time, from each of the plurality of processing devices. The preparation completion notification indicates completion of preparation for restart. The extension request is transmitted based on a determination that the preparation completion notification is not to be transmitted within the time-out time. The method further includes, powering off and restarting each of the plurality of processing devices in response to one of: a) reception of the preparation completion notification from all of the plurality of processing devices before an elapse of the time-out time, and b) the elapse of the time-out time. The method further includes, extending the time-out time by an extension time in response to reception of the extension request, and powering off and restarting each of the plurality of processing devices in response to one of: c) reception of the preparation completion notification from all of the processing devices before an elapse of the extension time, and d) the elapse of the extension time.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is a table illustrating an example of information stored in a nonvolatile memory in FIG. 3;

Figure 1:
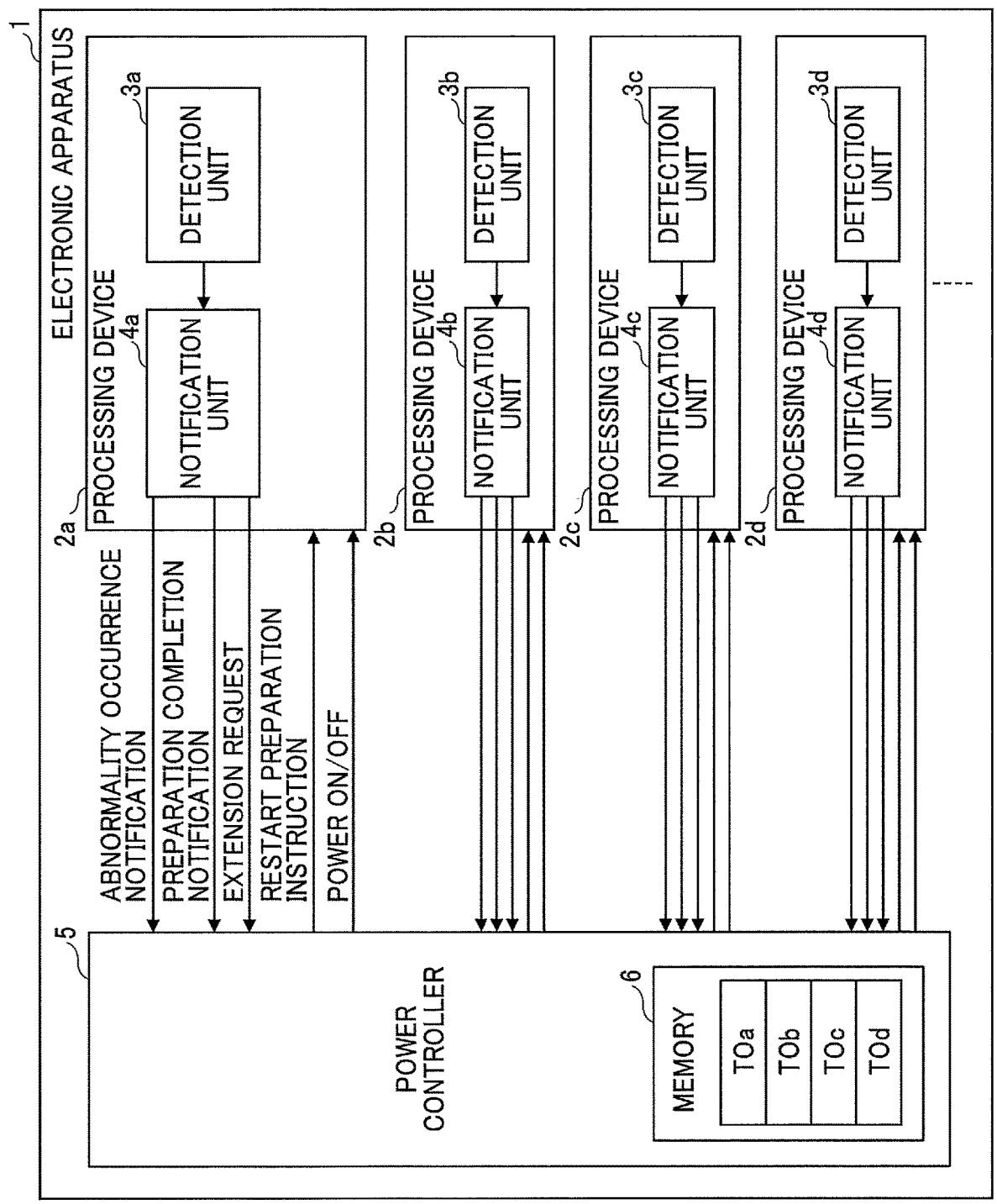
FIG. 1 is a block diagram illustrating an example of an electronic apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

Hereinafter, an electronic apparatus, a method for controlling electronic apparatus, and a non-transitory recording medium according to embodiments of the present disclosure are described in detail with reference to the accompanying drawings. The present disclosure, however, is not limited to the following one or more embodiments, and the elements of the following one or more embodiments include elements that may be easily conceived by those skilled in the art, those being substantially the same ones, and those being within equivalent ranges. Furthermore, various omissions, substitutions, changes, and combinations of the elements may be made without departing from the gist of the following one or more embodiments.

A description is given below, of embodiments of the present disclosure with reference to accompanying drawings. In the drawings, the same reference numerals are given to the same components, and redundant explanation may be omitted. In the drawings, a symbol indicating a signal is also used as a symbol indicating a signal line.

FIG. 1 is a block diagram illustrating an example of an electronic apparatus according to a first embodiment of the present disclosure. For example, an electronic apparatus 1 illustrated in FIG. 1 is a multifunction peripheral (MFP) such as a multifunction printer, and includes a plurality of processing devices 2 (2a, 2b, 2c, and 2d) such as a controller, an operation unit, an engine, and a facsimile that respectively execute a plurality of types of processing, and a power controller 5. The power controller 5 (serving as a controller) controls power supplies to each of the processing devices 2. The power controller 5 may be mounted on any one of the processing devices 2.

Each of the processing devices 2 includes a detection unit 3 (3a, 3b, 3c, or 3d) for detecting an occurrence of abnormality and a notification unit 4 (4a, 4b, 4c, or 4d). Each of the notification units 4 transmits an abnormality occurrence notification to the power controller 5 when the occurrence of abnormality is detected by the corresponding detection unit 3. Each of the notification units 4 transmits a preparation completion notification to the power controller 5 when the preparation for restart is completed. When the corresponding notification unit 4 fails to transmit the preparation completion notification to the power controller 5 within a time-out time TO (TOa, TOb, TOc, and TOd) set for each of the processing devices 2, the corresponding notification unit 4 transmits an extension request of the time-out time TO to the power controller 5.

The power controller 5 includes a memory 6 that stores the respective time-out times TO (TOa, TOb, TOc, and TOd) for the processing devices 2. The memory 6 is not particularly limited but is preferably a rewritable nonvolatile memory such as a flash memory. Based on a reception of the abnormality occurrence notification from any of the processing devices 2, the power controller 5 transmits a restart preparation instruction to the rest of the processing devices 2 other than a transmission source of the abnormality occurrence notification. After transmitting the restart preparation instruction, the power controller 5 waits for the preparation completion notification from each of the processing devices 2 until the time-out time TO of each of the processing devices 2 elapses.

When the power controller 5 does not receive the extension request from any of the processing devices 2, the power controller 5 operates as follows. When the power controller 5 receives the preparation completion notification from all of the processing devices 2 before the time-out time TO elapses, or when the time-out time TO elapses, the power controller 5 turns off and thereafter turns on the power source of each of the processing devices 2 to restart each of the processing devices 2.

On the other hand, when the power controller 5 receives the extension request, the power controller 5 operates as follows: The power controller 5 further waits for an extension time ET to elapse after the time-out time TO corresponding to the processing device 2 that is the transmission source of the extension request. When the power controller 5 receives the preparation completion notification from all of the processing devices 2 before the extension time ET elapses, or when the extension time ET elapses, the power controller 5 turns off and thereafter turns on the power source of each of the processing devices 2 to restart each of the processing devices 2.

Figure 2:
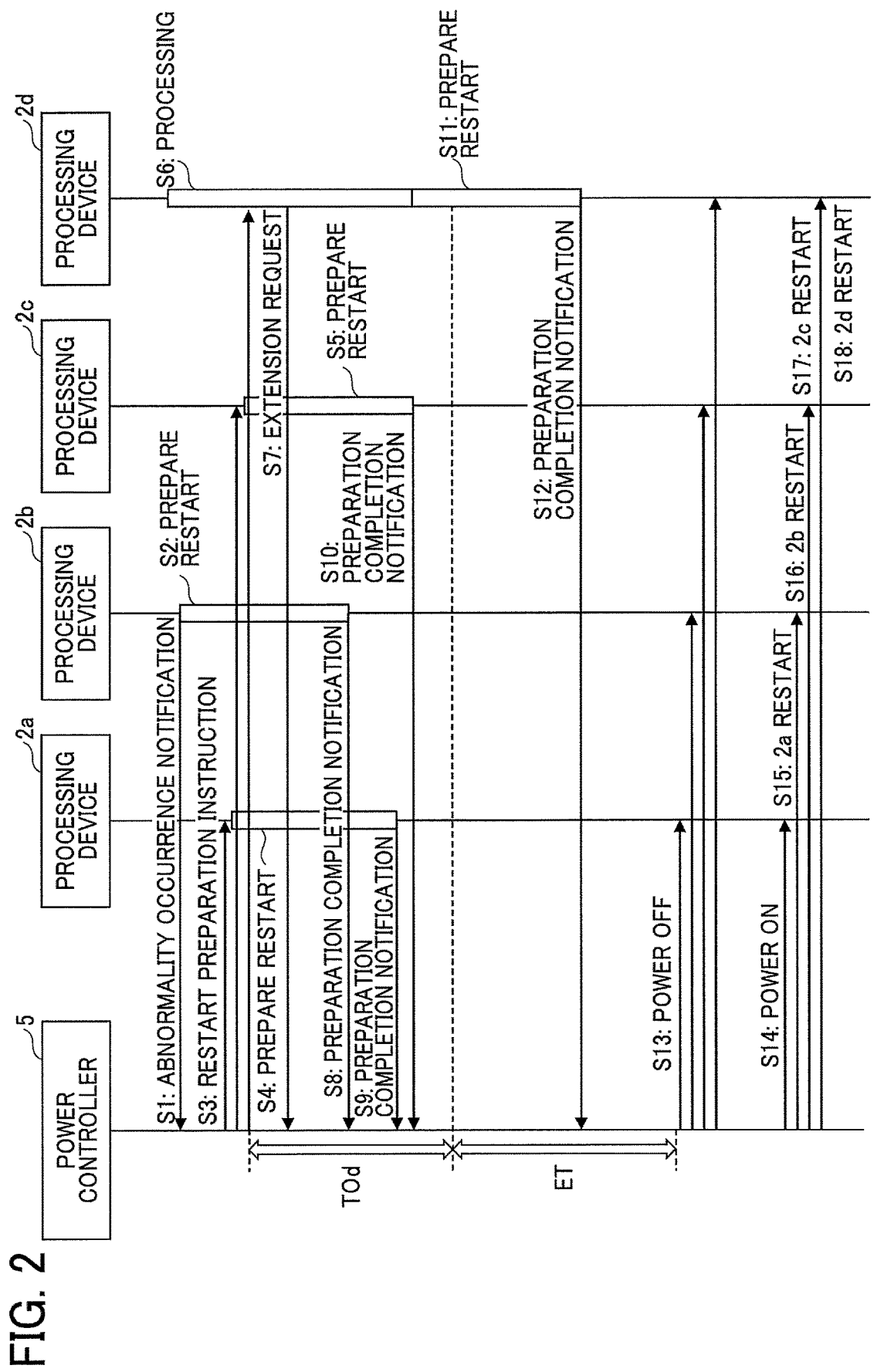
FIG. 2 is a sequence diagram illustrating an example of a restart process of the electronic apparatus in FIG. 1.

FIG. 2 is a sequence diagram illustrating an example of a restart process of the electronic apparatus 1 in FIG. 1. In the example illustrated in FIG. 2, in S1, the detection unit 3b of the processing device 2b detects an abnormality of the processing device 2b during an operation of the processing device 2b and transmits the abnormality occurrence notification to the power controller 5. In S2, the processing device 2b starts a preparation for restart based on the detection of abnormality by the detection unit 3b irrespective of whether the restart preparation instruction is received.

In S3, the power controller 5 transmits the restart preparation instruction to the processing devices 2a, 2c, and 2d based on the abnormality occurrence notification from the processing device 2b. In S4 and S5, the processing devices 2a and 2c start the preparation for restart based on the restart preparation instruction. For example, each of the processing devices 2 stores a log in a nonvolatile memory, and stores work data, various parameters, and the like, which may be lost due to a power turn-off, in the nonvolatile memory in preparation for restart. The nonvolatile memory that stores the log, the work data, and the like may be mounted on each of the processing devices 2 or may be connected to each of the processing devices 2 via a communication line.

In S6, the processing device 2d that receives the restart preparation instruction during executing the processing determines that the preparation for restart fails to be completed within the time-out time TOd set for the processing device 2d. In such a case, in S7, the processing device 2d transmits the extension request to extend the time-out time TOd to the power controller 5.

After transmitting the restart preparation instruction to the processing devices 2a, 2c, and 2d in S3, the power controller 5 starts measuring the time-out time TO. Thereafter, the power controller 5 receives the extension request from the processing device 2d and sets a new time-out time that is the sum of the extension time ET and the time-out time TOd corresponding to the processing device 2d. In S8, S9, and S10, the power controller 5 receives the preparation completion notification from the processing devices 2a, 2b, and 2c.

In S11, the processing device 2d starts the preparation for restart after completion of the processing being executed. For example, the time-out time TOd before the extension elapses during the preparation for restart by the processing device 2d. Upon reception of the extension request, setting the new time-out time that is the sum of the extension time ET and the time-out time TOd can reduce a possibility that the power source of the processing device 2d is turned off during the processing being executed or the preparation for restart. Such setting can reduce a possibility of loss of data that needs to be stored after processing and loss of a log recorded during executing the processing. Consequently, a decrease in reliability of the electronic apparatus 1 can be prevented.

On the other hand, when the extension time ET is not set, the power controller 5 turns off the power source of each of the processing devices 2 based on an elapse of the time-out time TOd. In such a case, there is a high possibility that the power source is turned off during executing the processing or the preparation for restart by the processing device 2d. Consequently, there is a risk of loss of data that needs to be stored after executing the processing and a log recorded during executing the processing.

For example, the extension time ET is set for each of the processing devices 2. Thus, the extension time ET can be set to an optimum time according to the processing time and the preparation time for restart by each of the processing devices 2. Note that the extension time ET may be common to all of the processing devices 2.

In S12, based on the completion of the preparation for restart, the processing device 2d transmits the preparation completion notification to the power controller 5 before the extension time ET elapses. Based on a reception of the preparation completion notification from all of the processing devices 2 before the elapse of the extension time ET, in S13 and S14 the power controller 5 turns off and thereafter turns on the power source of each of the processing devices 2 for restart in S15 to S18.

In FIG. 2, for easy understanding, the power re-turning on of each of the processing devices 2 is illustrated at different timings. However, in practice, the power sources are re-turned on substantially at the same time. A processor such as a central processing unit (CPU) mounted on each of the processing devices 2 executes a power-on sequence by turning on the power source again, and then executes an initialization process. By re-turning on the power source of each of the processing devices 2 substantially at the same time, the initialization processes among the processing devices 2 can be synchronized with each other, and the initialization processes can be normally executed. The detection unit 3 and the notification unit 4 are implemented as the CPU of the processing device 2 operated according to a program.

Note that, when the processing device 2d determines that the preparation for restart can be completed within the time-out time TOd, the processing device 2d does not transmit the extension request to the power controller 5. In such a case, based on the reception of the preparation completion notification from all of the processing devices 2, the power controller 5 turns off and thereafter turns on the power source of each of the processing devices 2 to restart each of the processing devices 2.

As described above, in this embodiment, any of the processing devices 2 transmits the extension request of the time-out time TO to the power controller 5 when the preparation for restart fails to be completed within the time-out time TO. When the extension request is received, the power controller 5 sets the new time-out time that is the sum of the extension time ET and the time-out time TO of the processing device 2 that is the transmission source of the extension request. Accordingly, such setting can reduce the possibility that the power source is turned off during executing the processing or the preparation for restart by the processing device 2, and the electronic apparatus 1 can be normally restarted.

On the other hand, when the time-out time TO elapses before the extension request is received or when the extension time ET elapses, the power controller 5 restarts each of the processing devices 2 even though the preparation completion notification is not received from all of the processing devices 2. For example, while the log or the work data are being stored in the nonvolatile memory during the preparation for restart, the processing device 2 may fail in accessing the nonvolatile memory because of an influence of the occurrence of abnormality in another processing device 2. Particularly, the failure is more likely to occur when the nonvolatile memory in which the data is stored is mounted on the processing device 2 in which the abnormality occurs.

In such a case, the processing device 2 fails to complete the preparation for restart, and therefore fails to transmit the preparation completion notification to the power controller 5. However, by setting the time-out time TO, the power controller 5 can restart the electronic apparatus 1 by turning off and thereafter turning on the power source of each of the processing devices 2 even when any of the processing devices 2 fails to transmit the preparation completion notification. As a result, the electronic apparatus 1 can be prevented from being in a hang-up state caused by the power controller 5 that continuously waits for the preparation completion notification.

Figure 3:
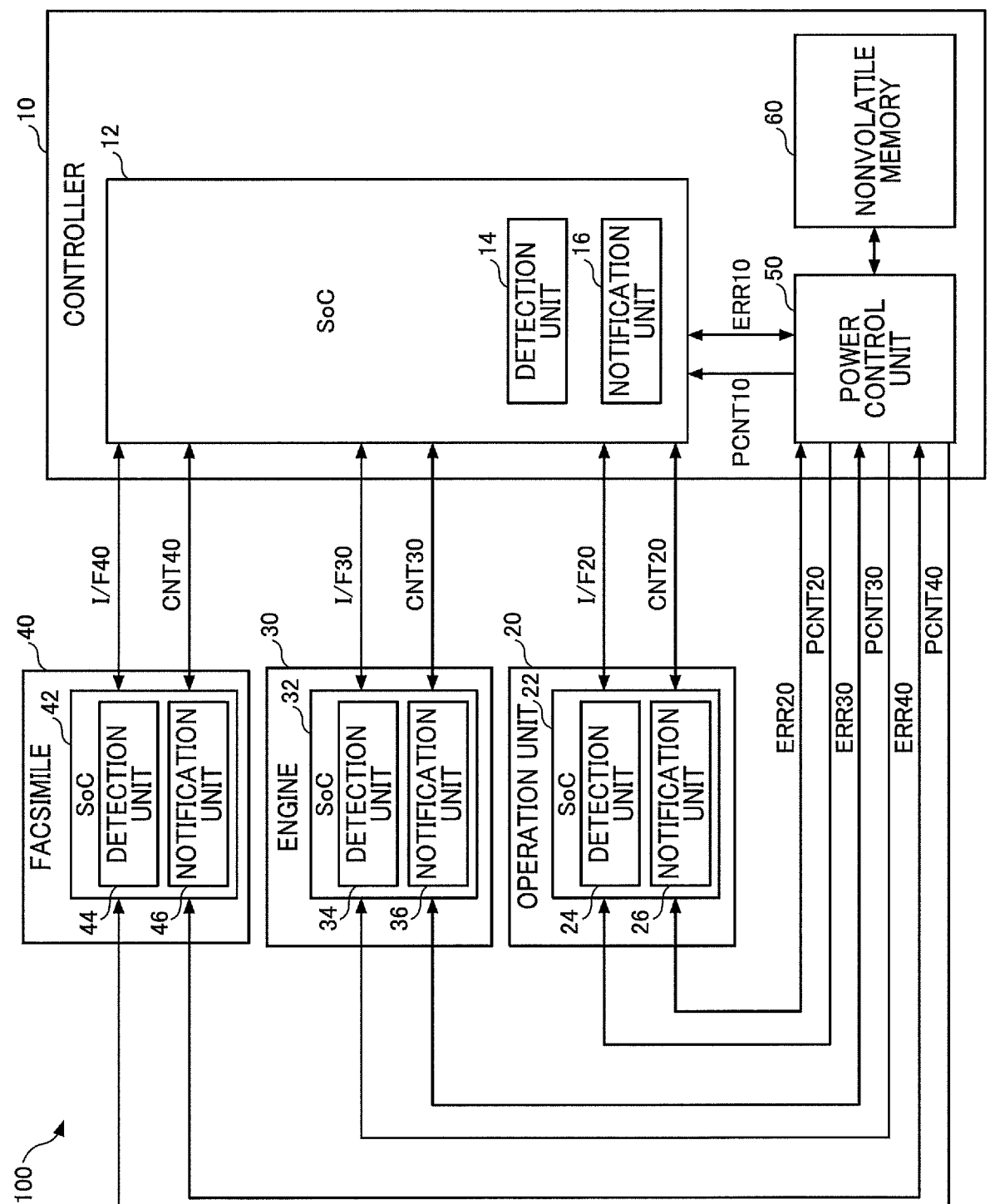
FIG. 3 is a block diagram illustrating an example of an electronic apparatus according to a second embodiment of the present disclosure.

FIG. 3 is a block diagram illustrating an example of an electronic apparatus according to a second embodiment of the present disclosure. Detailed descriptions of elements similar to those in FIG. 1 are omitted. For example, an electronic apparatus 100 illustrated in FIG. 3 is a multifunction peripheral (MFP) such as a multifunction printer (image forming apparatus), and includes a controller 10, an operation unit 20, an engine 30, and a facsimile 40. Each of the controller 10, the operation unit 20, the engine 30, and the facsimile 40 is an example of a processing device. The operation unit 20 is also an example of an operation device, and the facsimile 40 is also an example of a facsimile device.

The controller 10 includes a system on a chip (SoC) 12, a power control unit 50, and a nonvolatile memory 60. The SoC 12 includes a detection unit 14 and a notification unit 16. For example, the nonvolatile memory 60 is an electrically rewritable memory such as a flash memory. The operation unit 20 includes a SoC 22 including a detection unit 24 and a notification unit 26. The engine 30 includes a SoC 32 including a detection unit 34 and a notification unit 36. The facsimile 40 includes a SoC 42 including a detection unit 44 and a notification unit 46.

The power control unit 50 is an example of a power control device that controls power supply to each of the controller 10, the operation unit 20, the engine 30, and the facsimile 40. The power control unit 50 may be provided outside the controller 10 as long as the power control unit 50 is provided inside the electronic apparatus 100.

The SoC 12 of the controller 10 controls the operation unit 20, the engine 30, and the facsimile 40 and may have a function of controlling an entire operation of the electronic apparatus 100. The SoC 12 and the SoC 42 of the facsimile 40 are connected via an input/output interface I/F40 such as a peripheral component interconnect express (PCIe) and a control line CNT40 such as a general purpose input/output (GPIO) or the like.

The SoC 12 and the SoC 32 of the engine 30 are connected via an input/output interface I/F30 such as PCIe and a control line CNT30 such as GPIO. The SoC 12 and the SoC 22 of the operation unit 20 are connected via an input/output interface I/F20 such as a universal serial bus (USB) and a control line CNT20.

The detection unit 14 of the controller 10 detects an abnormality that occurs in the controller 10 (excluding the power control unit 50). When the detection unit 14 detects the occurrence of abnormality, the notification unit 16 transmits an abnormality occurrence notification to the power control unit 50 via an error signal line ERR10. The notification unit 16 receives a restart preparation instruction from the power control unit 50 via the error signal line ERR10. When the controller 10 (excluding the power controller unit 50) completes the preparation for restart, the notification unit 16 transmits a preparation completion notification to the power control unit 50 via the error signal line ERR10. When the notification unit 16 fails to transmit the preparation completion notification to the power control unit 50 within a time-out time, the notification unit 16 transmits a request to extend the time-out time instead of the preparation completion notification to the power control unit 50 via the error signal line ERR10.

The detection unit 24 of the operation unit 20 detects an abnormality that occurs in the operation unit 20. When the detection unit 24 detects the occurrence of abnormality, the notification unit 26 transmits the abnormality occurrence notification to the power control unit 50 via an error signal line ERR20. The notification unit 26 receives the restart preparation instruction from the power control unit 50 via the error signal line ERR20. When the operation unit 20 completes the preparation for restart, the notification unit 26 transmits the preparation completion notification to the power control unit 50 via the error signal line ERR20. When the notification unit 26 fails to transmit the preparation completion notification to the power control unit 50 within the time-out time, the notification unit 16 transmits a request to extend the time-out time instead of the preparation completion notification to the power control unit 50 via the error signal line ERR20.

The detection unit 34 of the engine 30 detects an abnormality that occurs in the engine 30. When the detection unit 34 detects the occurrence of abnormality, the notification unit 36 transmits the abnormality occurrence notification to the power control unit 50 via an error signal line ERR30. The notification unit 36 receives the restart preparation instruction from the power control unit 50 via the error signal line ERR30. When the engine 30 completes the preparation for restart, the notification unit 36 transmits the preparation completion notification to the power control unit 50 via the error signal line ERR30. When the notification unit 36 fails to transmit the preparation completion notification to the power control unit 50 within the time-out time, the notification unit 36 transmits a request to extend the time-out time instead of the preparation completion notification to the power control unit 50 via the error signal line ERR30.

The detection unit 44 of the facsimile 40 detects an abnormality that occurs in the facsimile 40. When the detection unit 44 detects the occurrence of abnormality, the notification unit 46 transmits the abnormality occurrence notification to the power control unit 50 via an error signal line ERR40. The notification unit 46 receives the restart preparation instruction from the power control unit 50 via the error signal line ERR40. When the facsimile 40 completes the preparation for restart, the notification unit 46 transmits the preparation completion notification to the power control unit 50 via the error signal line ERR40. When the notification unit 46 fails to transmit the preparation completion notification to the power control unit 50 within the time-out time, the notification unit 46 transmits a request to extend the time-out time instead of the preparation completion notification to the power control unit 50 via the error signal line ERR40.

The detection units 24, 34, and 44 are examples of a detection device. The notification units 26, 36, and 46 are examples of a notification device. Note that, for example, the SoCs 12, 22, 32, and 42, and the power control unit 50 each include a processor such as a microcomputer or a CPU that executes a control program.

The power control unit 50 receives the abnormality occurrence notification, the preparation completion notification, and the extension request from the SoC 12, and transmits the restart preparation instruction to the SoC 12 via the error signal line ERR10. The power control unit 50 transmits a power source control signal PCNT10 to the SoC 12. The power source control signal PCNT10 is a signal that controls turning on and off the power source of the SoC 12.

The SoC 12 can receive the power source control signal PCNT10 and restart the SoC 12 itself even during a power-off. The SoC 12 turns on based on the power source control signal PCNT10 that instructs a power-on, executes an initialization sequence, and activates the controller 10 (excluding the power control unit 50). The SoC 12 turns off based on the power source control signal PCNT10 that instructs the power-off. Note that the power control unit 50 is constantly in operation using a power supplied from an external power supply.

The power control unit 50 receives the abnormality occurrence notification, the preparation completion notification, and the extension request from the SoC 22 via the error signal line ERR20 and transmits the restart preparation instruction to the SoC 22. The power control unit 50 transmits a power source control signal PCNT20 to the SoC 22. The power source control signal PCNT20 is a signal that controls turning on and off the power source of the SoC 22.

The SoC 22 can receive the power source control signal PCNT20 and restart the SoC 22 itself even during the power-off. The SoC 22 turns on based on the power source control signal PCNT20 that instructs the power-on, executes the initialization sequence, and activates the operation unit 20. The SoC 22 turns off based on the power source control signal PCNT20 that instructs the power-off.

The power control unit 50 receives the abnormality occurrence notification, the preparation completion notification, and the extension request from the SoC 32 via the error signal line ERR30 and transmits the restart preparation instruction to the SoC 32. The power control unit 50 transmits a power source control signal PCNT30 to the SoC 32. The power source control signal PCNT30 is a signal that controls turning on and off the power source of the SoC 32.

The SoC 32 can receive the power source control signal PCNT30 and restart the SoC 32 itself even during the power-off. The SoC 32 turns on based on the power source control signal PCNT30 that instructs the power-on, executes the initialization sequence, and activates the engine 30. The SoC 32 turns off based on the power source control signal PCNT30 that instructs the power-off.

The power control unit 50 receives the abnormality occurrence notification, the preparation completion notification, and the extension request from the SoC 42 via the error signal line ERR40 and transmits a restart preparation instruction to the SoC 42. The power control unit 50 transmits a power source control signal PCNT40 to the SoC 42. The power source control signal PCNT40 is a signal that controls turning on and off the power source of the SoC 42.

The SoC 42 can receive the power source control signal PCNT40 and restart the SoC 42 itself even during the power-off. The SoC 42 turns on based on the power source control signal PCNT40 that instructs the power-on, executes the initialization sequence, and activates the facsimile 40. The SoC 42 turns off based on the power source control signal PCNT40 that instructs the power-off.

Alternatively, instead of the power source control signals PCNT10, PCNT20, PCNT30, and PCNT40, power supply lines may be wired between the power controller unit 50 and each of SoC 12, SoC 22, SoC 32, and SoC 42, and the power control unit 50 may directly turn on and off the power source of each of SoCs 12, 22, 32, and 42.

FIG. 4 is a table illustrating an example of information stored in the nonvolatile memory 60 in FIG. 3. The nonvolatile memory 60 stores time information such as the time-out time, an extension time 1EX, and an extension time 2EX for each of the controller 10, the operation unit 20, the engine 30, and the facsimile 40.

The power control unit 50 selects either the extension time 1EX or the extension time 2EX based on the information included in the extension request received from the controller 10, the operation unit 20, the engine 30, and the facsimile 40. For example, when the engine 30 receives the restart preparation instruction during preparing printing or printing an image on a sheet, the engine 30 transmits the extension request including the information indicating the extension time 1EX (60 seconds) to the power control unit 50. When the engine 30 receives the restart preparation instruction during reading an image by a scanner, the engine 30 transmits the extension request including information indicating the extension time 2EX (120 seconds) to the power control unit 50.

Similarly, when the controller 10, the operation unit 20, and the facsimile 40 receive the restart preparation instruction during executing the processing, the controller 10, the operation unit 20, and the facsimile 40 transmit the extension request including the information indicating either the extension time 1EX or the extension time 2EX to the power control unit 50 according to a time it takes for the processing to be executed. Thus, the power control unit 50 can set the optimum extension time according to the time it takes for the processing being to be executed. As a result, the electronic apparatus 100 can minimize a time from the occurrence of abnormality to the restart according to the time it takes for the processing to be executed. Furthermore, setting the optimum extension time can prevent a failure that the power source is turned off during executing the processing or the preparation for restart.

Figure 5:
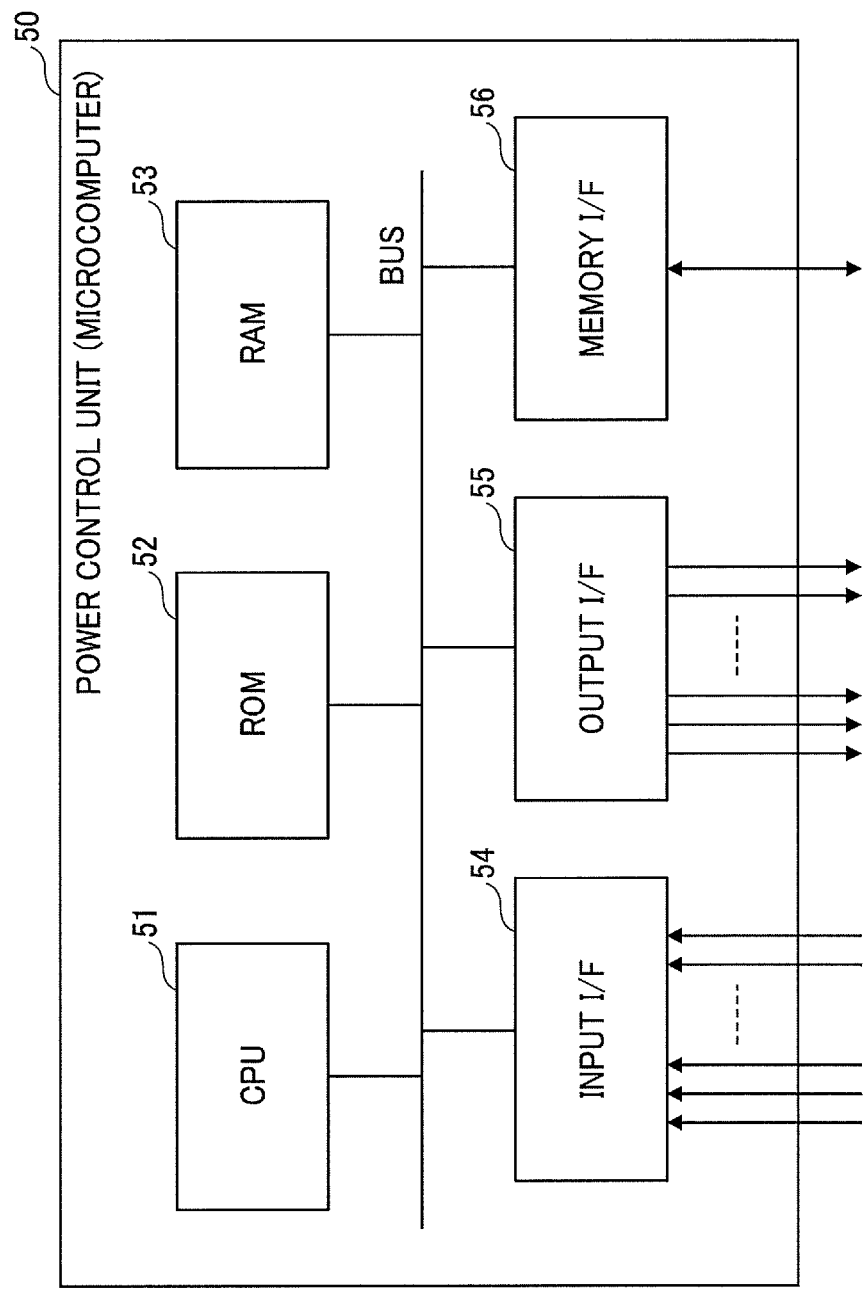
FIG. 5 is a block diagram illustrating an example of a hardware configuration of a power control unit in FIG. 3.

FIG. 5 is a block diagram illustrating an example of a hardware configuration of the power control unit 50 in FIG. 3. For example, the power control unit 50 is a microcomputer. The power control unit 50 includes a central processing unit (CPU) 51, a read only memory (ROM) 52, a random access memory (RAM) 53, an input interface 54, an output interface 55, and a memory interface 56, which are connected to each other via a bus BUS.

Figure 6:
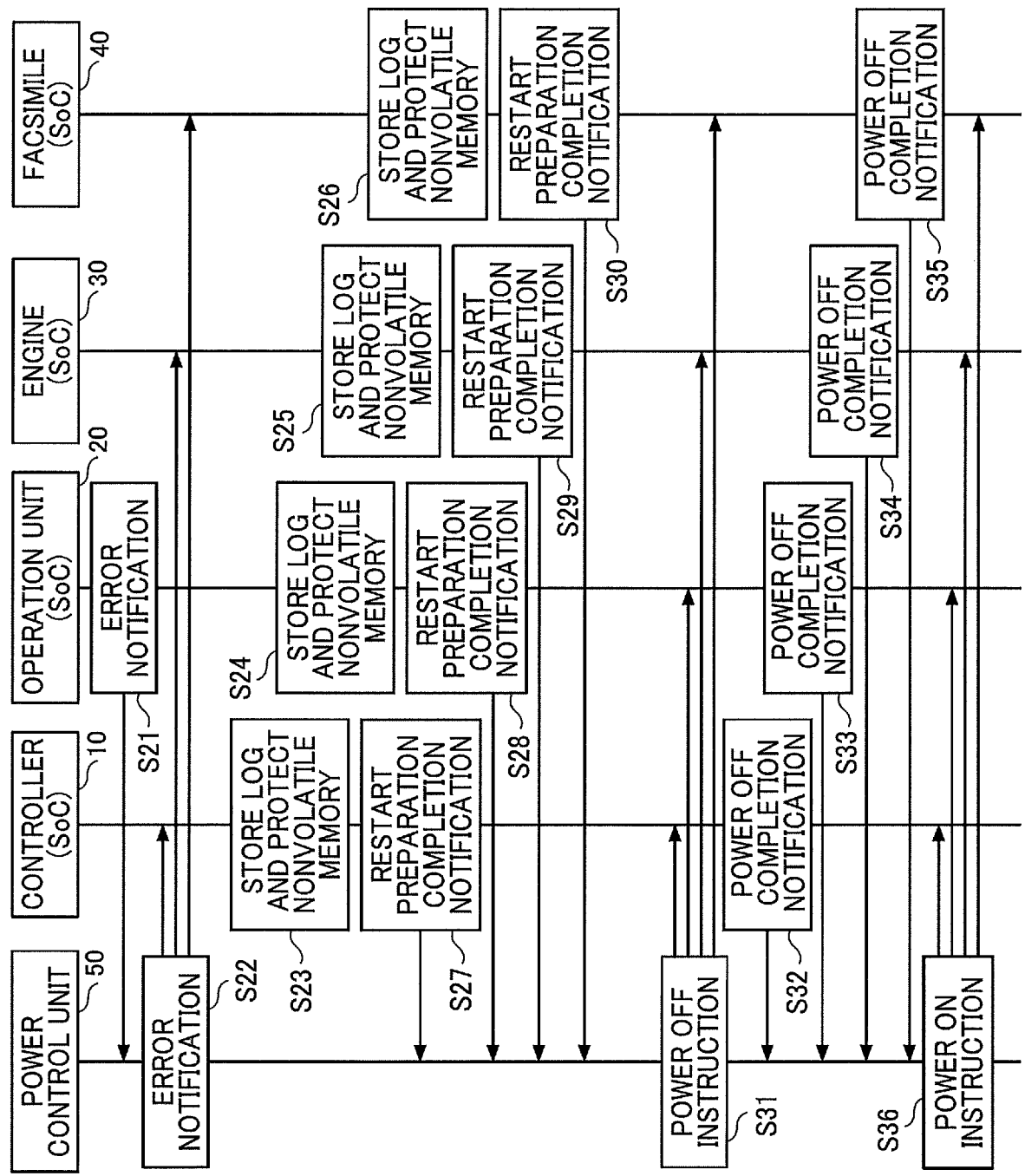
FIG. 6 is a sequence diagram illustrating an example of a restart process of the electronic apparatus in FIG. 3.

The CPU 51 executes a control program stored in the ROM 52 to control a restart of a power source illustrated in FIG. 6 and subsequent figures. The input interface 54 receives the abnormality occurrence notification, the preparation completion notification, and the extension request. The output interface 55 transmits the restart preparation instruction, the power off instruction, and the power on instruction. The memory interface 56, for example, is a Serial Peripheral Interface (SPI) that is connected to the nonvolatile memory 60 such as a serial flash memory.

FIG. 6 is a sequence diagram illustrating an example of a restart process of the electronic apparatus 100 in FIG. 3. Detailed descriptions of operations similar to those in FIG. 2 are omitted. The operations illustrated in FIG. 6 are implemented by the processor of the power control unit 50 executing a control method according to a control program of the electronic apparatus 100.

In the example illustrated in FIG. 6, the detection unit 24 of the operation unit 20 detects an error that occurs in the operation unit 20. In S21, the notification unit 26 of the operation unit 20 transmits an error notification to the power control unit 50 based on the detection of the error by the detection unit 24. The error notification to the power control unit 50 is an example of the abnormality occurrence notification.

Based on the error notification from the operation unit 20, in S22 the power control unit 50 transmits the error notification to the controller 10, the engine 30, and the facsimile 40 other than the transmission source of the error notification. The error notification from the power control unit 50 is an example of the restart preparation instruction. Note that, when the power control unit 50 receives the error notification from any two or more out of the controller 10, the operation unit 20, the engine 30, and the facsimile 40, the power control unit 50 transmits the error notification to the processing devices other than a transmission sources of the error notification.

Based on the error notification, in S23, S25, and S26, each of the controller 10, the engine 30, and the facsimile 40 stores a log that has been acquired, the data to be used after the restart, and the like in the nonvolatile memory, and then protects the nonvolatile memory. In S24, the operation unit 20 that does not receive the error notification stores a log that has been acquired and the like in the nonvolatile memory based on the detection of the error occurrence by the detection unit 24, and then protects the nonvolatile memory. Note that the data and the like may be stored in the nonvolatile memory mounted on each of the processing devices (the controller 10, the operation unit 20, the engine 30, and the facsimile 40) that generates the log, or may be stored in an external nonvolatile memory.

Each of the controller 10, the operation unit 20, the engine 30, and the facsimile 40 that has completed storing the log and protecting the nonvolatile memory transmits a restart preparation completion notification to the power control unit 50 in S27 to S30. The power control unit 50 waits until the power control unit 50 receives the restart preparation completion notification from all of the controller 10, the operation unit 20, the engine 30, and the facsimile 40. At this point, the power control unit 50 receives the restart preparation completion notifications before the respective time-out times of the controller 10, the operation unit 20, the engine 30, and the facsimile 40 elapse.

In S31, the power control unit 50 transmits a power off instruction to the controller 10, the operation unit 20, the engine 30, and the facsimile 40 based on a reception of the restart preparation completion notification from all of the controller 10, the operation unit 20, the engine 30, and the facsimile 40. Each of the controller 10, the operation unit 20, the engine 30, and the facsimile 40 that has received the power off instruction executes a power off process, and then transmits a power off completion notification to the power control unit 50 in S32 to S35. Each of the controller 10, the operation unit 20, the engine 30, and the facsimile 40 can transmit the power off completion notification to the power control unit 50 even after the power source is turned off.

In S36, the power control unit 50 transmits a power on instruction to the controller 10, the operation unit 20, the engine 30, and the facsimile 40 substantially at the same time based on a reception of the power off completion notification from all of the controller 10, the operation unit 20, the engine 30, and the facsimile 40. Then, each of the controller 10, the operation unit 20, the engine 30, and the facsimile 40 that has been turned on based on the power on instruction is restarted at the same timing.

Figure 7:
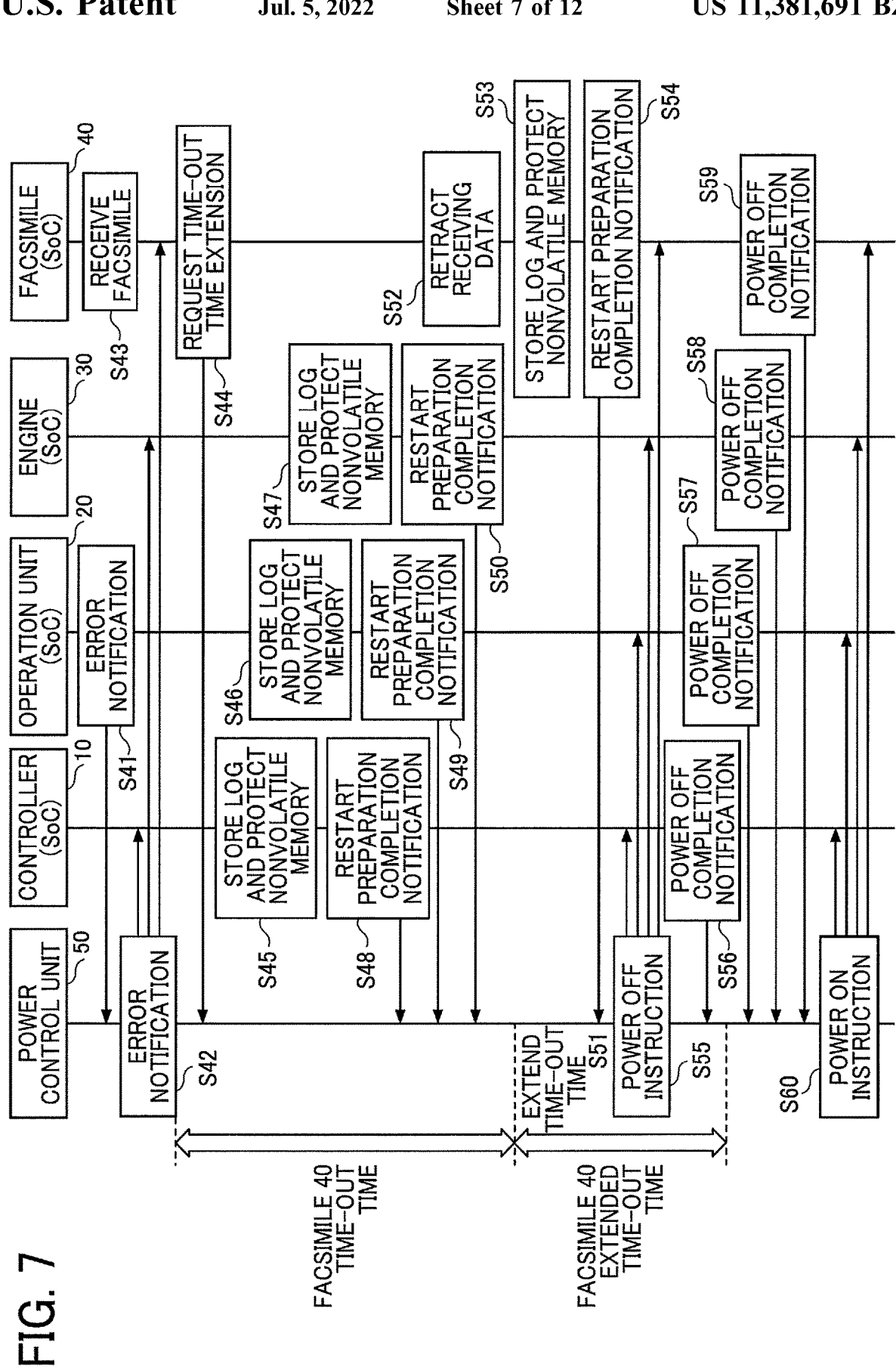
FIG. 7 is a sequence diagram illustrating another example of the restart process of the electronic apparatus in FIG. 3.

FIG. 7 is a sequence diagram illustrating another example of the restart process of the electronic apparatus 100 in FIG. 3. Detailed descriptions of operations similar to those in FIGS. 2 and 6 are omitted. The operations illustrated in FIG. 7 are implemented by the processor of the power control unit 50 executing the control method according to the control program of the electronic apparatus 100.

The operations of the controller 10, the operation unit 20, and the engine 30 are the same as those in FIG. 6. Therefore, as in the sequence diagram illustrated in FIG. 6, the operation unit 20 transmits the error notification to the power control unit 50 in S41, and then the power control unit 50 transmits the error notification to the controller 10, the engine 30, and the facsimile 40 in S42. Note that since the operations in S45 to S47, S48 to S50, and S56 to S59 are the same as those in S23 to S25, S27 to S29, and S32 to S35 of FIG. 6 respectively, descriptions thereof are omitted.

In FIG. 7, in S43, the facsimile 40 receives communication information via a telephone line or the like (facsimile reception) before receiving the error notification from the power control unit 50. The facsimile 40 that has received the error notification determines that the facsimile 40 fails to transmit the restart preparation completion notification to the power control unit 50 before the time-out time elapses if the facsimile 40 executes storing the log and the like after completing the reception of the communication information. Therefore, in S44, the facsimile 40 transmits the extension request including information indicating the extension time 1EX (30 seconds) of FIG. 4 to the power control unit 50.

Based on the reception of the extension request from the facsimile 40, in S51 the power control unit 50 extends the time-out time, that is, sets a new time-out time of the facsimile 40 to be 60 seconds that is the sum of the preset time-out time (30 seconds) and the extension time (30 seconds). After receiving the communication information, the facsimile 40 retracts the received data in the nonvolatile memory in S52. Then, in S53 the facsimile 40 stores a log that has been acquired and the like in the nonvolatile memory, protects the nonvolatile memory, and then transmits the restart preparation completion notification to the power control unit 50 in S54.

The power control unit 50 receives the restart preparation completion notification from the facsimile 40 within the new time-out time. Then, as in the sequence diagram illustrated in FIG. 6, in S55, the power off instruction is transmitted from the power control unit 50 to the controller 10, the operation unit 20, the engine 30, and the facsimile 40, and the power sources are turned off. Thereafter, the controller 10, the operation unit 20, the engine 30, and the facsimile 40 are turned on again in S60, and the electronic apparatus 100 is restarted.

In FIG. 7, setting the new time-out time based on the extension request can reduce, for example, the possibility that the facsimile 40 receives the power off instruction during the reception of the communication information, the retraction of the reception data of the communication information, or the storage of the log or the like after the reception of the communication information. As a result, such setting can reduce the possibility of losses of the reception data of the communication information, the log, and the like, and increase a reliability of the electronic apparatus 100.

The time-out time and the extension time are set for each of the controller 10, the operation unit 20, the engine 30, and the facsimile 40. Therefore, the optimum time-out time and the optimum extension time can be set suitably for each characteristic of the operation of the controller 10, the operation unit 20, the engine 30, and the facsimile 40. Furthermore, the controller 10, the operation unit 20, the engine 30, and the facsimile 40 can transmit a plurality of types of extension time according to the operation state to the power control unit 50. As a result, the electronic apparatus 100 can minimize the time from the occurrence of abnormality to the restart according to the time it takes for the processing to be executed.

Figure 8:
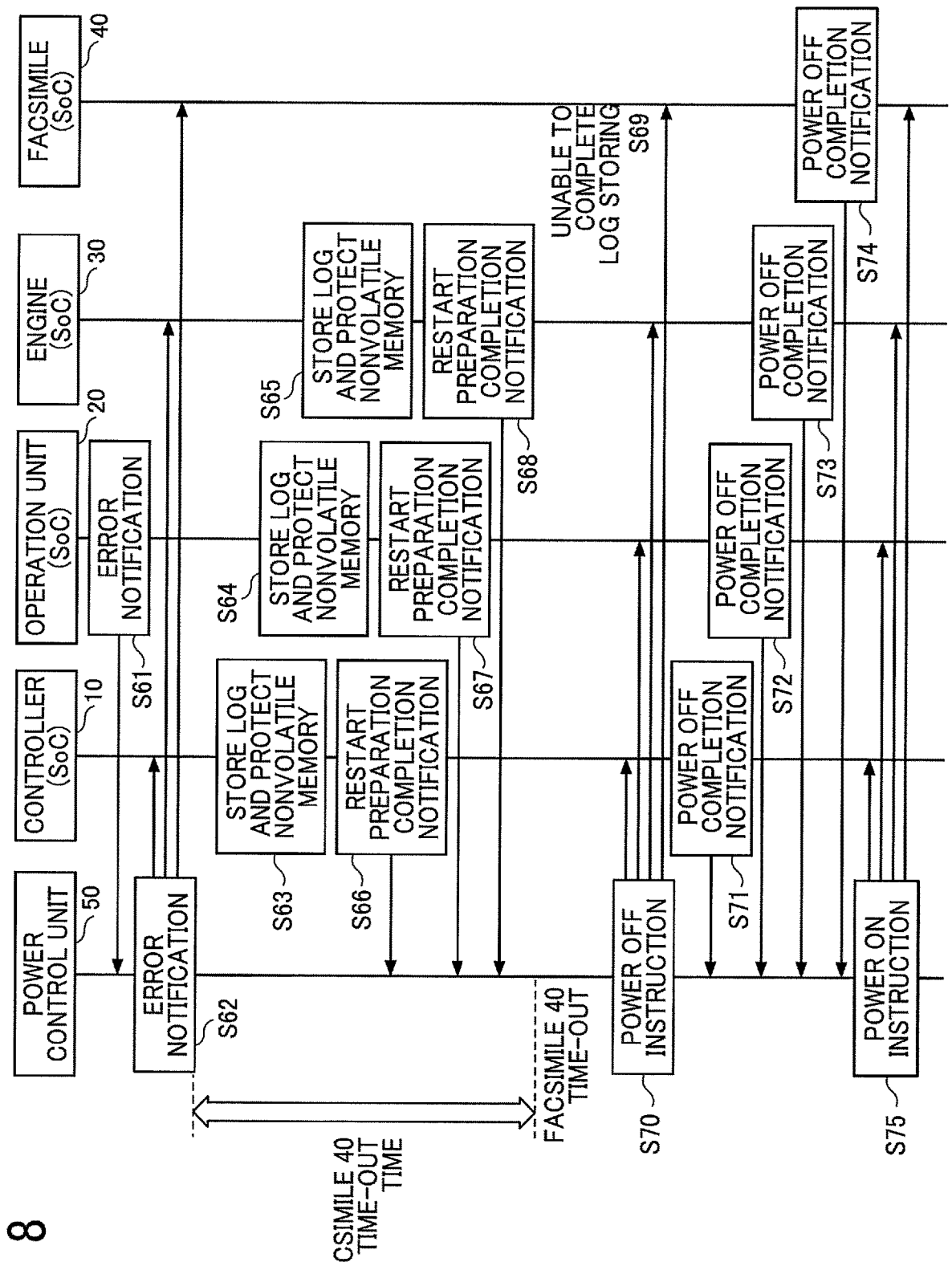
FIG. 8 is a sequence diagram illustrating another example of the restart process of the electronic apparatus in FIG. 3.

FIG. 8 is a sequence diagram illustrating another example of the restart process of the electronic apparatus 100 in FIG. 3. Detailed descriptions of operations similar to those in FIGS. 2 and 6 are omitted. The operations illustrated in FIG. 8 are implemented by the processor of the power control unit 50 executing the control method according to the control program of the electronic apparatus 100.

The operations of the controller 10, the operation unit 20, and the engine 30 are the same as those in FIG. 6. Therefore, as in the sequence diagram illustrated in FIG. 6, the operation unit 20 transmits the error notification to the power control unit 50 in S61, and then the power control unit 50 transmits the error notification to the controller 10, the engine 30, and the facsimile 40 in S62. Note that since the operations in S63 to S65, S66 to S68, and S71 to S74 are the same as those in S23 to S25, S27 to S29, and S32 to S35 of FIG. 6 respectively, descriptions thereof are omitted.

In FIG. 8, the facsimile 40 starts storing the log in the nonvolatile memory based on the reception of the error notification from the power control unit 50, but, for example, the facsimile 40 fails an access to the nonvolatile memory during the storage and fails to complete storing the log in S69. For this reason, the facsimile 40 fails to transmit the restart preparation completion notification to the power control unit 50. Since this is an unexpected failure, the facsimile 40 has not transmitted the extension request to the power control unit 50.

Since the power control unit 50 has not received the extension request, in S70 the power control unit 50 transmits the power off instruction to the controller 10, the operation unit 20, the engine 30, and the facsimile 40 based on an elapse of the time-out time of the facsimile 40. Then, as in the sequence diagram illustrated in FIG. 6, after the power sources of the controller 10, the operation unit 20, the engine 30, and the facsimile 40 are turned off, in S75 the power control unit 50 turns on again the power sources of the controller 10, the operation unit 20, the engine 30, and the facsimile 40 to restart the electronic apparatus 100.

By setting the time-out time in this manner, even when any of the controller 10, the operation unit 20, the engine 30, and the facsimile 40 fails to complete the preparation for restart, the electronic apparatus 100 can be restarted without hanging up. As a result, a decrease in reliability of the electronic apparatus 100 can be prevented.

Figure 9:
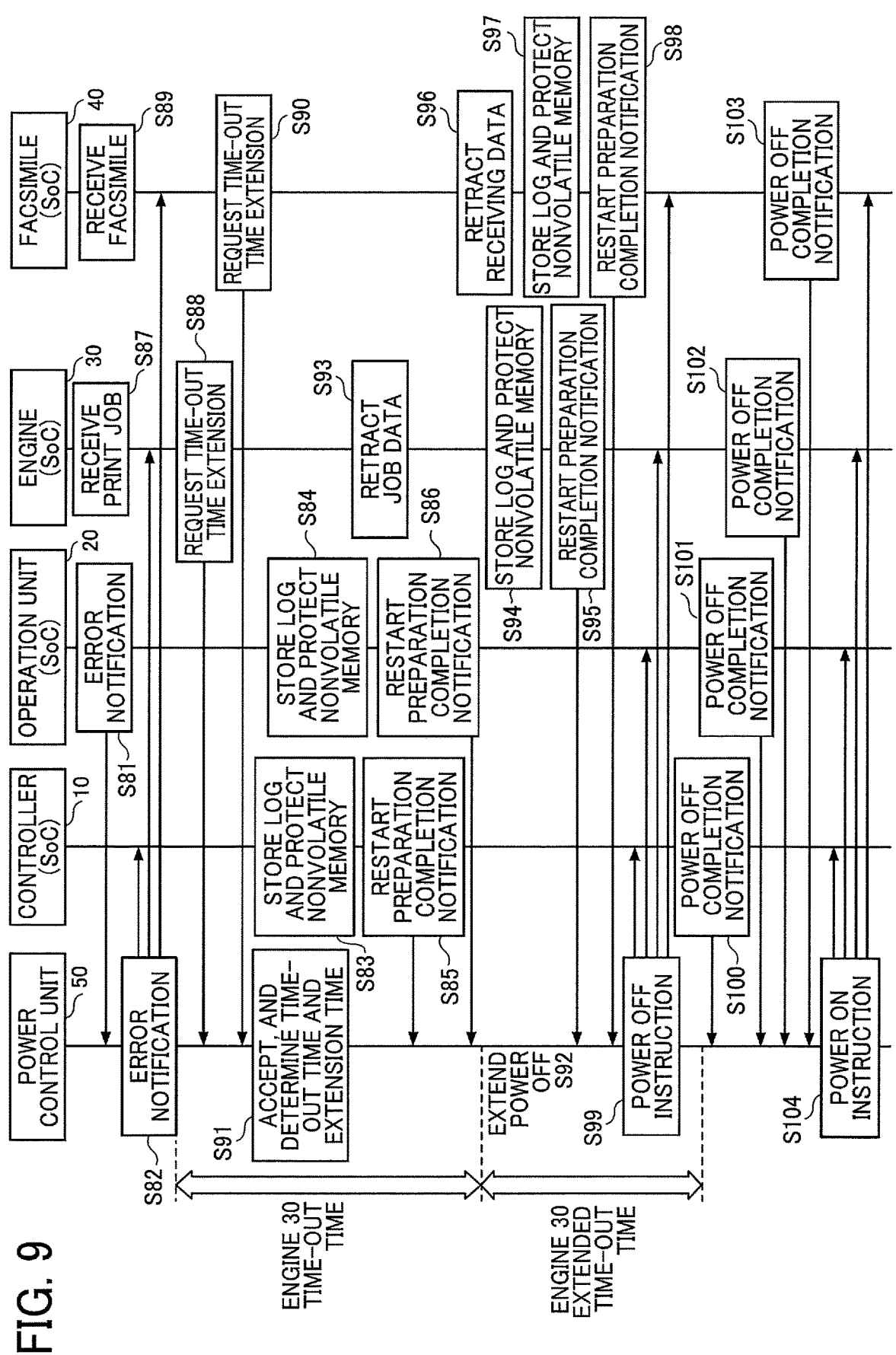
FIG. 9 is a sequence diagram illustrating another example of the restart process of the electronic apparatus in FIG. 3.

FIG. 9 is a sequence diagram illustrating another example of the restart process of the electronic apparatus 100 in FIG. 3. Detailed descriptions of operations similar to those in FIGS. 2, 6, and 8 are omitted. The operations illustrated in FIG. 9 are implemented by the processor of the power control unit 50 executing the control method according to the control program of the electronic apparatus 100.

The operations of the controller 10, the operation unit 20, and the facsimile 40 are the same as those in FIG. 7. The operations in S81, S82, S83, S84, S85, and S86 are the same as those in S41, S42, S45, S46, S48, and S49 of FIG. 7 respectively. The operations in S89, S96 to S98, and S100 to S103 are the same as those in S43, S52 to S54, and S56 to S59 of FIG. 7 respectively. Thus, descriptions thereof are omitted. In FIG. 9, in S87, the engine 30 receives a print job before receiving an error notification from the power control unit 50. The engine 30 that has received the error notification determines that the engine 30 fails to transmit the restart preparation completion notification to the power control unit 50 before the time-out time elapses if the engine 30 executes storing the log and the like after completing the print job. Therefore, in S88, the engine 30 transmits the extension request including information indicating the extension time 1EX (60 seconds) in FIG. 4 to the power control unit 50. Note that, as in the sequence diagram illustrated in FIG. 7, in S90 the facsimile 40 transmits the extension request including information indicating the extension time 1EX (30 seconds) of the facsimile 40 to the power control unit 50.

The power control unit 50 adds together the time-out time and the extension time for each of the engine 30 and the facsimile 40 based on the reception of the extension requests from the engine 30 and the facsimile 40. The sum of the time-out time and the extension time is 120 seconds for the engine 30 and 60 seconds for the facsimile 40. In S91 and S92, the power control unit 50 determines to adopt a pair of the time-out time and the extension time of the engine 30 that is larger than the pair of the time-out time and the extension time of the facsimile 40.

After executing the print job, the engine 30 retracts the job data in the nonvolatile memory in S93. Then, in S94 the engine 30 stores a log that has been acquired and the like in the nonvolatile memory, protects the nonvolatile memory, and then transmits the restart preparation completion notification to the power control unit 50 in S95.

The power control unit 50 successively receives the preparation completion notifications from the engine 30 and the facsimile 40 within the new time-out time after the extension. Then, as in the sequence diagrams illustrated in FIGS. 6 and 7, in S99 the power off instruction is transmitted from the power control unit 50 to the controller 10, the operation unit 20, the engine 30, and the facsimile 40, and the power sources are turned off. Thereafter, the controller 10, the operation unit 20, the engine 30, and the facsimile 40 are turned on again in S104, and the electronic apparatus 100 is restarted.

In FIG. 9, when the power control unit 50 receives a plurality of extension requests, the power control unit 50 determines to adopt a largest pair out of pairs of the time-out time and the extension time. Accordingly, such setting can reduce a possibility to receive the power off instruction during the operation or the storage of a log or the like of the controller 10, the operation unit 20, the engine 30, and the facsimile 40. As a result, such setting can reduce the possibility of losses of the reception data of the communication information, the log, and the like, and increase a reliability of the electronic apparatus 100.

Figure 10:
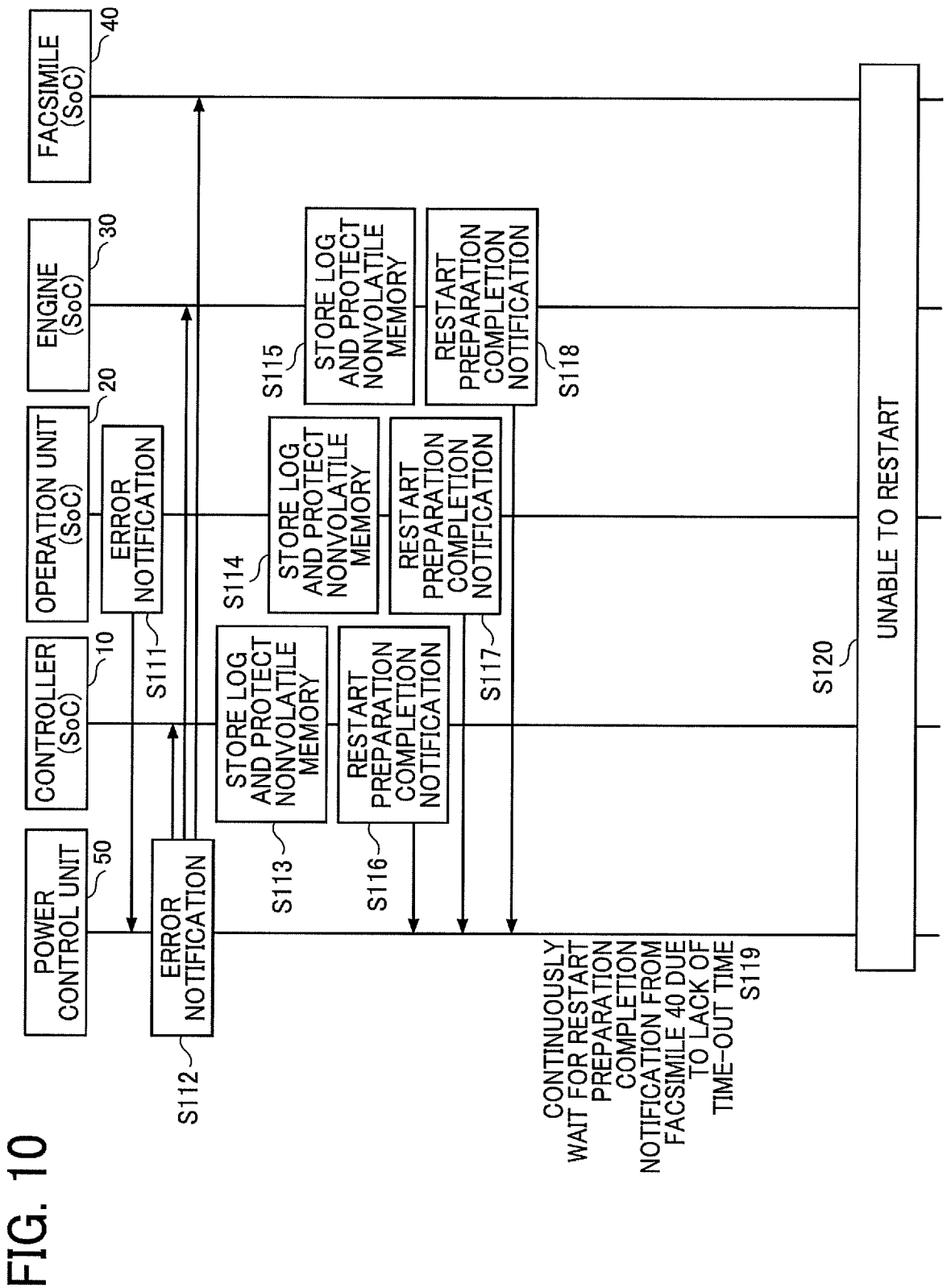
FIG. 10 is a sequence diagram illustrating an example of a restart process of an electronic apparatus according to a comparative example.

FIG. 10 is a sequence diagram illustrating an example of a restart process of an electronic apparatus according to a comparative example. Detailed descriptions of operations similar to those in FIG. 6 are omitted. Since the operations in S111 and S112, S113 to S115, and S116 to S118 are the same as those in S21 and S22, S23 to S25, and S27 to S29 of FIG. 6 respectively, descriptions thereof are omitted. The electronic apparatus that executes operations illustrated in FIG. 10 has the same functions as the electronic apparatus 100 illustrated in FIG. 3 except that the time-out time is not set.

In FIG. 10, the facsimile 40 starts storing the log in the nonvolatile memory based on the reception of the error notification from the power control unit 50, but, for example, the facsimile 40 fails an access to the nonvolatile memory during the storage and fails to complete storing the log. For this reason, the facsimile 40 fails to transmit the restart preparation completion notification to the power control unit 50.

Since the power control unit 50 does not manage the time-out time, in S119 the power control unit 50 continuously wait for the restart preparation completion notification from the facsimile 40. Consequently, in this comparative example, in S120, the power control unit 50 is unable to restart the electronic apparatus, resulting in a hang-up state of the electronic apparatus.

Also as described in this second embodiment, the same effects described in the first embodiment can be obtained. For example, setting the new time-out time based on the extension request can reduce the possibility that the facsimile 40 receives the power off instruction during the reception of the communication information, the retraction of the reception data of the communication information, or the storage of the log or the like after the reception of the communication information. As a result, such setting can reduce the possibility of losses of the reception data of the communication information, the log, and the like, and increase a reliability of the electronic apparatus 100.

In addition, since the time-out time and the extension time are individually set, the optimum time-out time and the optimum extension time can be set suitably for characteristic of the operation of each processing device. As a result, the electronic apparatus 100 can minimize the time from the occurrence of abnormality to the restart according to the time it takes for the processing to be executed. Setting the time-out time can prevent the power control unit 50 from continuously waiting for the restart preparation completion notification. As a result, the electronic apparatus 100 can be prevented from being in a hang-up state.

Furthermore, in this second embodiment, when the power control unit 50 receives the plurality of extension requests, the power control unit 50 determines to adopt the largest pair out of pairs of the time-out time and the extension time. Accordingly, such setting can reduce the possibility to receive the power off instruction during the operation or the storage of a log or the like. As a result, such setting can reduce the possibility of losses of the reception data of the communication information, the log, and the like, and increase a reliability of the electronic apparatus 100.

Figure 11:
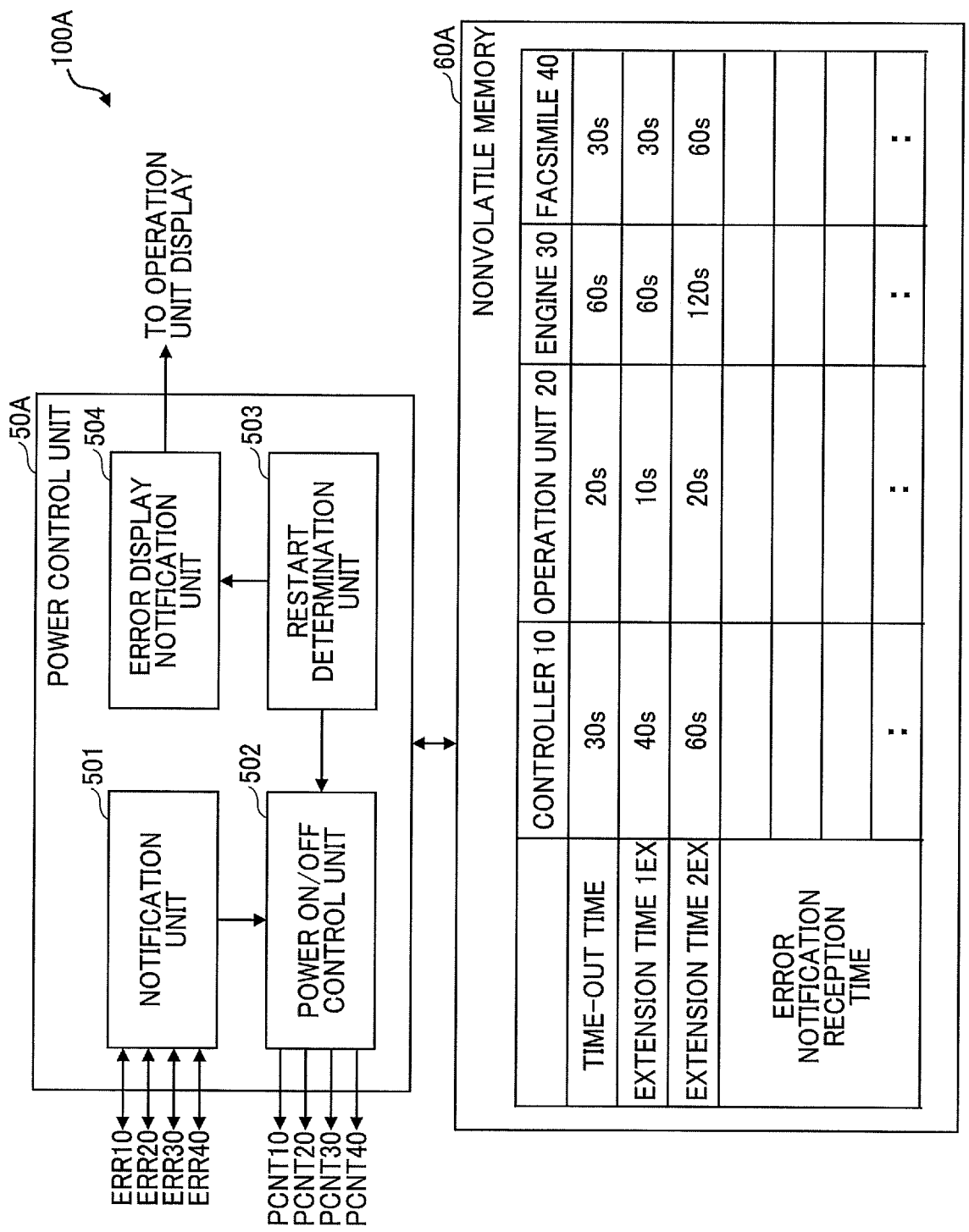
FIG. 11 is a block diagram illustrating an example of a main part of an electronic apparatus according to a third embodiment of the present disclosure.

FIG. 11 is a block diagram illustrating an example of a main part of an electronic apparatus according to a third embodiment of the present disclosure. FIG. 11 illustrates an electronic apparatus 100A that includes a power control unit 50A and a nonvolatile memory 60A instead of the power control unit 50 and the nonvolatile memory 60 illustrated in FIG. 3. The electronic apparatus 100A is the same as the electronic apparatus 100 of the second embodiment except that the electronic apparatus 100A includes the nonvolatile memory 60A instead of the nonvolatile memory 60 in FIG. 3 and a different control that the power control unit 50 executes.

The power control unit 50A includes a notification unit 501, a power on/off control unit 502, a restart determination unit 503, and an error display notification unit 504. Note that the power control unit 50 in FIG. 3 includes the notification unit 501 and the power on/off control unit 502.

The notification unit 501 receives various notifications from the controller 10, the operation unit 20, the engine 30, and the facsimile 40 via error signal lines ERR10 to ERR40. In addition, the notification unit 501 transmits various notifications to the controller 10, the operation unit 20, the engine 30, and the facsimile 40 via the error signal lines ERR10 to ERR40.

The power on/off control unit 502 transmits power source control signals PCNT10 to PCNT40 to the controller 10, the operation unit 20, the engine 30, and the facsimile 40 via power source control signal lines PCNT10 to PCNT40.

The restart determination unit 503 determines whether to restart a power source or to display an occurrence of an error as an error message to an outside based on an occurrence history of error notification (abnormality occurrence notification) for each of the controller 10, the operation unit 20, the engine 30, and the facsimile 40 stored in the nonvolatile memory 60A. When determining to restart the power source, the restart determination unit 503 permits the power on/off control unit 502 to turn off and thereafter turn on the power source. When determining to perform display of the occurrence of the error, the restart determination unit 503 prohibits the power on/off control unit 502 from turning off and thereafter turning on the power source and instructs the error display notification unit 504 to display the occurrence of the error.

Based on the instruction from the restart determination unit 503, the error display notification unit 504 displays "occurrence of unrecoverable error" on a display panel of the operation unit 20. For example, a user who sees "occurrence of unrecoverable error" on the display panel in the electronic apparatus 100 calls a service person who repairs the electronic apparatus 100.

The nonvolatile memory 60A has another area for storing reception times of the error notification from the power control unit 50 in addition to the area for storing the time-out time, the extension time 1EX, and the extension time 2EX for each of the controller 10, the operation unit 20, the engine 30, and the facsimile 40 illustrated in FIG. 4. That is, the nonvolatile memory 60A has the area for storing the occurrence history of error notification (abnormality occurrence notification) for each of the controller 10, the operation unit 20, the engine 30, and the facsimile 40.

For example, when the error notification is received, the power control unit 50 sequentially stores the reception time in a vacant area among the areas for storing the reception times in the nonvolatile memory 60A. Accordingly, the power control unit 50 can manage the time, the number, and then the frequency of the error occurrence for each of the controller 10, the operation unit 20, the engine 30, and the facsimile 40.

The time and the number of the error occurrence for each of the controller 10, the operation unit 20, the engine 30, and the facsimile 40 can be displayed on the display panel of the operation unit 20 in the maintenance mode. For example, the service person who repairs the electronic apparatus 100A shifts the mode of the electronic apparatus 100A from the user mode to the maintenance mode and operates the electronic apparatus 100A to display information stored in the nonvolatile memory 60A on the display panel. As a result, the service person can check a location, the frequency, and the like of the error occurrence at once based on the information displayed on the display panel and can easily analyze the failure. As a result, repair workability can be improved.

The restart determination unit 503 determines whether or not to transmit the error display instruction to the error display notification unit 504 based on the occurrence history of error notification stored in the nonvolatile memory 60A. For example, when an error occurs twice in anyone of the controller 10, the operation unit 20, the engine 30, and the facsimile 40, the restart determination unit 503 transmits the error display instruction to the error display notification unit 504.

Alternatively, when the frequency of the error occurrence in any of the controller 10, the operation unit 20, the engine 30, and the facsimile 40 is equal to or higher than a predetermined frequency, the restart determination unit 503 transmits the error display instruction to the error display notification unit 504. The predetermined frequency is, for example, stored in the memory by a manufacturer based on empirical data. The restart determination unit 503 prohibits the power source from being turned on again in accordance with the number or the frequency of the error occurrence. Thus, the electronic apparatus 100A can be prevented from being restarted many times because of an error that occurs repeatedly.

Also as described in this third embodiment, the same effects described in the first and the second embodiments can be obtained. Furthermore, in this embodiment, the occurrence history of error notification is stored in the nonvolatile memory 60A for each of the controller 10, the operation unit 20, the engine 30, and the facsimile 40. This makes it possible to manage the time, the number, and then the frequency of the error occurrence. For example, the error display instruction is transmitted to the error display notification unit 504 based on the occurrence history of error notification.

The service person who repairs the electronic apparatus 100A can check the location, the frequency, and the like of the error occurrence at once based on the information stored in the nonvolatile memory 60A and can easily analyze the failure. As a result, repair workability can be improved.

(Hardware Configuration of Electronic Apparatus)

Figure 12:
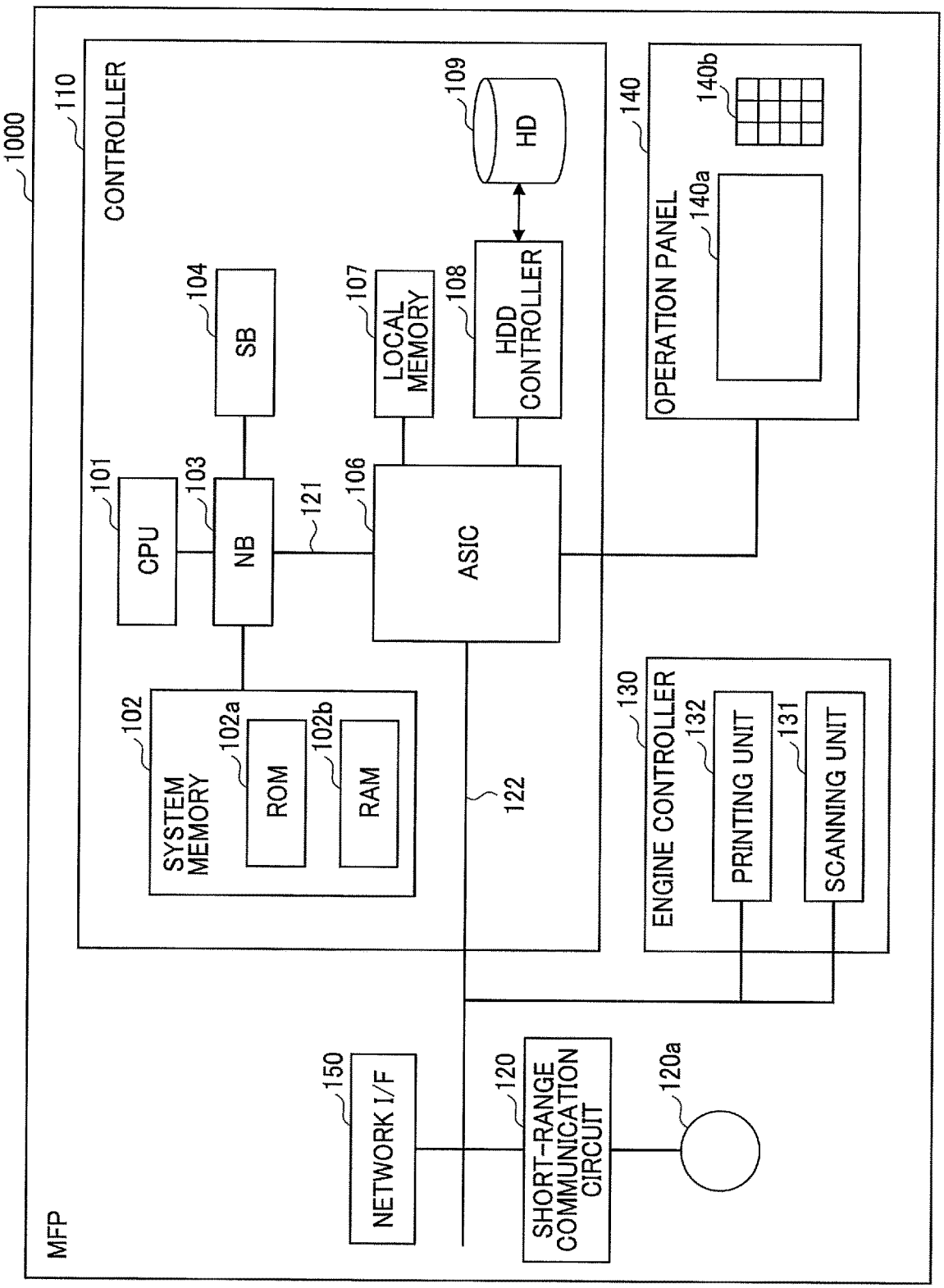
FIG. 12 is a diagram of a hardware configuration of the electronic apparatuses illustrated in FIGS. 1, 3, and 11.

FIG. 12 is a hardware configuration diagram of the electronic apparatuses 1, 100, and 100A respectively illustrated in FIGS. 1, 3, and 11. The electronic apparatuses 1, 100, and 100A are multifunction peripherals (so-called an MFP) having a copying function, a printing function, a scanning function, a facsimile communication function, and the like. Note that the electronic apparatuses 1, 100, and 100A are examples of an "information processing apparatus." Hereinafter, the electronic apparatuses 1, 100, and 100A are referred to as an MFP 1000.

As illustrated in FIG. 12, the MFP 1000 includes a controller 110, a short-range communication circuit 120, an engine controller 130, an operation panel 140, and a network interface (I/F) 150.

The controller 110 includes a central processing unit (CPU) 101 as a main processor, a system memory 102, a north bridge (NB) 103, a south bridge (SB) 104, an application specific integrated circuit (ASIC) 106, a local memory 107, a hard disk drive (HDD) controller 108, and a hard drive (HD) 109 as a storage area. An Accelerated Graphics Port (AGP) bus 121 connects the NB 103 and the ASIC 106. Note that the configuration of the controller 110 is not limited to the configuration illustrated in FIG. 12. For example, two or more components such as the CPU 101, the NB 103, and the SB 104 may be implemented by a system on chip (SoC). In such a case, the SoC and the ASIC 106 may be connected via a PCI-EXPRESS BUS.

The CPU 101 is a controller that controls an entire operation of the MFP 1000. The NB 103 is a bridge for connecting the CPU 101 to the system memory 102, the SB 104, and the AGP bus 121, and includes a memory controller that controls reading and writing to the system memory 102, a peripheral component interconnect (PCI) master, and an AGP target.

The system memory 102 includes a read only memory (ROM) 102a and a random access memory (RAM) 102b. The ROM 102a stores programs and data for implementing various functions of the controller 110. The RAM 102b is used to load the programs and the data. The RAM 102b is also used as a drawing memory to store drawing data for printing. The program stored in the ROM 102a may be stored in any computer-readable storage medium, such as a compact disc-read only memory (CD-ROM), compact disc-recordable (CD-R), or digital versatile disc (DVD), in a file format installable or executable by a computer for distribution.

The SB 104 is a bridge to connect the NB 103 to a PCI device and a peripheral device. The ASIC 106 is an integrated circuit (IC) having a hardware element for image formation and dedicated to an image processing use and serves as a bridge that connects the AGP bus 121, a PCI bus 122, the HDD controller 108, and the local memory 107 to each other. The ASIC 106 includes a PCI target, an AGP master, an arbiter (ARB) as a central processor of the ASIC 106, a memory controller for controlling the local memory 107, a plurality of direct memory access controllers (DMACs) capable of converting coordinates of image data with a hardware logic, and a PCI unit that transfers data between a scanning unit 131 and a printing unit 132 via the PCI bus 122. Note that a universal serial bus (USB) interface or an Institute of Electrical and Electronics Engineers 1394 (IEEE 1394) interface may be connected to the ASIC 106.

The local memory 107 is a local memory used as a copy image buffer and a code buffer. The HD 109 is a storage area for storing image data, font data for printing, and forms. The HDD controller 108 controls reading and writing of various data from and to the HD 109 under control of the CPU 101.

The AGP bus 121 is a bus interface for a graphics accelerator card, which has been proposed to accelerate graphics processing. Through directly accessing the system memory 102 by high-throughput, speed of the graphics accelerator card is improved.

Further, the short-range communication circuit 120 includes an antenna 120a. The short-range communication circuit 120 is a communication circuit in compliance with the near field communication (NFC), BLUETOOTH or the like.

Furthermore, the engine controller 130 includes the scanning unit 131 and the printing unit 132. The controller 110 controls the entire operation of the MFP 1000. For example, the controller 110 controls drawing, communication, and user inputs to the operation panel 140. The scanning unit 131 and the printing unit 132 have a capability of image processing such as error diffusion and gamma conversion.

Note that, in response to an instruction to select a specific application through the operation panel 140 by use of, e.g., an application switch key, the MFP 1000 sequentially selects function of document server, copying, printing, and facsimile communication. When the document server function is selected, the operation mode switches to a document box mode. With selection of the copying function, the operation mode switches to a copy mode. With selection of the printing function, the operation mode switches to a printer mode. With selection of the facsimile communication function, the operation mode switches to a facsimile mode. The operation panel 140 includes a display unit and an input unit. The display unit includes a liquid crystal display (LCD) for displaying various information and a light emitting diode (LED) for displaying an operation state by turning on/off. The input unit includes a touch panel and hardware keys, and the like. Note that, when the operation panel 140 includes the input unit having the touch panel, the hardware keys may be omitted. Further, the operation panel 140 may be connected to the ASIC 106 or may be connected to the SB 104.

The network I/F 150 is an interface that controls data communication via a communication network. The short-range communication circuit 120 and the network I/F 150 are electrically connected to the ASIC 106 via the PCI bus 122.

Note that the electronic apparatuses 100 and 100A described above are not limited to an image forming apparatus. The electronic apparatuses 100 and 100A may be, for example, a projector (PJ), an interactive white board (IWB; an electronic white board having a blackboard function capable of mutual communication), an output device such as a digital signage, a head-up display (HUD) device, an industrial machine, an imaging device, a sound collecting device, a medical device, a network home appliance, an automobile (connected car), a laptop PC, a mobile phone, a smartphone, a tablet terminal, a game console, a personal digital assistant (PDA), a digital camera, a wearable PC, or a desktop PC.

Each of the functions of the described embodiments can be implemented by one or more processing circuits or circuitry. Here, the "processing circuit or circuitry" in the present disclosure includes a programmed processor to execute each function by software, such as a processor implemented by an electronic circuit, and devices, such as an application specific integrated circuit (ASIC), a digital signal processor (DSP), a field programmable gate array (FPGA), and conventional circuit modules arranged to perform the recited functions.

Although the present disclosure has been described based on the respective embodiments, the present disclosure is not limited to the requirements described in the above embodiments. The elements of the above-described embodiments can be modified without departing from the gist of the present disclosure and can be appropriately determined according to the application form. Any one of the above-described operations may be performed in various other ways, for example, in an order different from the one described above.

The invention claimed is:

1. An electronic apparatus comprising:
a plurality of processing devices;
a controller configured to control power supply to each of the plurality of processing devices; and
a memory that stores a time-out time for each of the plurality of processing devices and an extension time for processing executed by the plurality of processing devices,
each of the plurality of processing devices including first circuitry configured to:
  detect an occurrence of an abnormality;
  transmit an abnormality occurrence notification to the controller in response to detecting the occurrence of the abnormality;
  transmit a preparation completion notification to the controller in response to completion of preparation for restart; and
  transmit an extension request of the time-out time to the controller in response to determining that the preparation completion notification is not to be transmitted to the controller within the time-out time,
the controller further including second circuitry configured to:
  based on reception of the abnormality occurrence notification, transmit a restart preparation instruction to a rest of the plurality of processing devices other than a transmission source of the abnormality occurrence notification;
  wait for the preparation completion notification in response to transmission of the restart preparation instruction, from each of the plurality of processing devices until an elapse of the time-out time;
  power off and restart each of the plurality of processing devices in response to one of:
    a) reception of the preparation completion notification from all of the plurality of processing devices before the elapse of the time-out time, and
    b) the elapse of the time-out time; and
  extend the time-out time by the extension time in response to reception of the extension request; and
  power off and restart each of the plurality of processing devices in response to one of:
    c) reception of the preparation completion notification from all of the processing devices before an elapse of the extension time, and
    d) the elapse of the extension time.

2. The electronic apparatus according to claim 1, wherein:
the extension request transmitted to the controller by any of the plurality of processing devices includes information indicating the extension time to complete the processing being executed;
the memory stores the extension time corresponding to the information indicating the extension time to complete the processing being executed in addition to the time-out time for each of the plurality of processing devices; and
the second circuitry of the controller waits for the elapse of the extension time corresponding to the information indicating the extension time included in the received extension request in addition to the elapse of the time-out time.

3. The electronic apparatus according to claim 2, wherein:
each of the plurality of processing devices executes a plurality of types of processing,
the information indicating the extension time, included in the extension request, is one of a plurality of pieces of information respectively corresponding to the plurality of types of processing; and
the memory stores a plurality of extension times respectively corresponding to the plurality of pieces of information for each of the plurality of processing devices.

4. The electronic apparatus according to claim 2, wherein:
when the controller receives the extension request from two or more of the plurality of processing devices, the second circuitry of the controller selects a set of the extension time and the time-out time having the largest sum, out of a plurality of sets of the extension time indicated by the information in the received extension request and the time-out time corresponding to the extension time.

5. The electronic apparatus according to claim 2, wherein:
the second circuitry of the controller stores a history of the abnormality occurrence notification for each of the plurality of processing devices in the memory.

6. The electronic apparatus according to claim 5, wherein:
the second circuitry of the controller determines whether to power off and restart each of the plurality of processing devices or to notify an error to an outside of the electronic apparatus based on the history of the abnormality occurrence notification for each of the plurality of processing devices in the memory.

7. The electronic apparatus according to claim 6, wherein:
the second circuitry of the controller notifies the error to the outside when a frequency of the abnormality occurrence notification of at least one of the plurality of processing devices is equal to or higher than a predetermined frequency for each of the plurality of processing devices based on the history of the abnormality occurrence notification stored in the memory.

8. The electronic apparatus according to claim 1, wherein:
the plurality of processing devices includes:
a facsimile device;
an engine configured to scan and print an image;
an operation device configured to input and display information; and
circuitry configured to control the facsimile device, the engine, and the operation device, and
the plurality of processing devices together functions as an image forming apparatus.

9. The electronic apparatus according to claim 1, wherein the controller includes:
the memory; and
a power controller configured to control power supply to the plurality of electronic devices.

10. A method for controlling an electronic apparatus including a plurality of processing devices, the method comprising:
based on reception of an abnormality occurrence notification from at least one of the plurality of processing devices detecting an occurrence of an abnormality, transmitting a restart preparation instruction to a rest of the plurality of processing devices other than a transmission source of the abnormality occurrence notification;

waiting for a preparation completion notification in response to transmission of the restart preparation instruction, or an extension request of a time-out time, from each of the plurality of processing devices, the preparation completion notification indicating completion of preparation for restart, the extension request being transmitted based on a determination that the preparation completion notification is not to be transmitted within the time-out time;

powering off and restarting each of the plurality of processing devices in response to one of: a) reception of the preparation completion notification from all of the plurality of processing devices before an elapse of the time-out time, and b) the elapse of the time-out time; and extending the time-out time by an extension time in response to reception of the extension request, and powering off and restarting each of the plurality of processing devices in response to one of: c) reception of the preparation completion notification from all of the processing devices before an elapse of the extension time, and d) the elapse of the extension time.

11. A non-transitory recording medium storing a plurality of program codes which, when executed by one or more processors, causes the processors to perform a method for controlling power supply to each of a plurality of processing devices of an electronic apparatus, the method comprising:

based on reception of an abnormality occurrence notification from at least one of the plurality of processing devices detecting an occurrence of an abnormality, transmitting a restart preparation instruction to a rest of the plurality of processing devices other than a transmission source of the abnormality occurrence notification;

waiting for a preparation completion notification in response to transmission of the restart preparation instruction, or an extension request of a time-out time, from each of the plurality of processing devices, the preparation completion notification indicating completion of preparation for restart, the extension request being transmitted based on a determination that the preparation completion notification is not to be transmitted within the time-out time;

powering off and restarting each of the plurality of processing devices in response to one of: a) reception of the preparation completion notification from all of the plurality of processing devices before an elapse of the time-out time, and b) the elapse of the time-out time; and extending the time-out time by an extension time in response to reception of the extension request, and powering off and restarting each of the plurality of processing devices in response to one of: c) reception of the preparation completion notification from all of the processing devices before an elapse of the extension time, and d) the elapse of the extension time.

\* \* \* \* \*